US011606005B2

(12) United States Patent
Yang et al.

(10) Patent No.: US 11,606,005 B2
(45) Date of Patent: Mar. 14, 2023

(54) ROTOR END RING WITH OIL JACKET

(71) Applicant: GM Global Technology Operations LLC, Detroit, MI (US)

(72) Inventors: Xiaofeng Yang, Troy, MI (US); Wei Zeng, Oakland Township, MI (US); Lei Hao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 464 days.

(21) Appl. No.: 16/860,695

(22) Filed: Apr. 28, 2020

(65) Prior Publication Data

US 2021/0336510 A1    Oct. 28, 2021

(51) Int. Cl.
*H02K 9/193* (2006.01)
*H02K 1/32* (2006.01)

(52) U.S. Cl.
CPC ............... *H02K 9/193* (2013.01); *H02K 1/32* (2013.01); *H02K 2213/03* (2013.01)

(58) Field of Classification Search
CPC .................................. H02K 9/193; H02K 1/32
See application file for complete search history.

(56) References Cited

U.S. PATENT DOCUMENTS

2010/0194220 A1* 8/2010 Tatematsu .............. H02K 1/32
310/61
2010/0237725 A1* 9/2010 Tatematsu ................ B60L 7/14
310/61
2019/0280548 A1* 9/2019 Takahashi .............. H02K 21/14

FOREIGN PATENT DOCUMENTS

DE     102018200865 A1 *  7/2019  ............. H02K 1/28
WO   WO-2015025648 A1 *  2/2015  ............. H02K 1/276

OTHER PUBLICATIONS

Froehlich (DE 102018200865 A1) English Translation (Year: 2019).*
Furuta (WO 2015025648 A1) English Translation (Year: 2015).*

* cited by examiner

*Primary Examiner* — Tulsidas C Patel
*Assistant Examiner* — Robert E Mates
(74) *Attorney, Agent, or Firm* — Vivacqua Crane, PLLC

(57) ABSTRACT

An electric motor includes a housing, a stator having end turn windings, a rotatable central shaft, a rotor mounted onto the central shaft, and a rotor end ring mounted onto the central shaft adjacent the rotor, the rotor end ring including an annular disk shaped body having a circumferential outer diameter and a circumferential inner diameter and being formed from a thermally conductive material, a recess formed within a face of the body, an oil jacket formed within a back side of the body, the oil jacket comprising an annular channel having a circumferential outer wall and a circumferential inner wall, two inlets, each inlet extending radially between the inner diameter of the body and the inner wall of the oil jacket, a plurality of outlets, each outlet comprising a circumferential slot, the plurality of outlets equidistantly spaced around the face adjacent the circumferential inner wall of the oil jacket.

17 Claims, 3 Drawing Sheets

ROTOR END RING WITH OIL JACKET

INTRODUCTION

The present disclosure relates to an electric motor having a rotor end ring. Specifically, a rotor end ring of the present disclosure includes an oil jacket to improve cooling characteristics of the rotor end ring.

Coolant is routed through an electric motor to provide cooling of the electric motor during operation. Electrical currents flowing within an electric motor create heat, and if some of that heat is not removed, damage or failure of the electric motor can occur. Coolant that flows through and across a rotor end ring absorbs heat from the rotor end ring. Typically, coolant passes through the rotor end ring and is propelled, by centrifugal forces, across the face of the rotor end ring. In current electric motors, the coolant is forced outward toward the outer circumference of the rotor end ring without spreading out. This means that coolant is only running across localized portions of the face of the rotor end ring.

Thus, while current technologies achieve their intended purpose, there is a need for a new and improved electric motor having a rotor end ring adapted to provide more efficient cooling of the rotor end ring.

SUMMARY

According to several aspects of the present disclosure, a rotor end ring for an electric motor includes an annular disk shaped body having a circumferential outer diameter and a circumferential inner diameter, a recess formed within a face of the body, an oil jacket formed within a back side of the body, at least one inlet adapted to allow coolant to enter the oil jacket, and a plurality of outlets adapted to allow coolant to flow from the oil jacket, through the rotor end ring to the recess formed within the face of the body.

According to another aspect, the oil jacket is an annular channel having a circumferential outer wall and a circumferential inner wall.

According to another aspect, the circumferential outer wall of the oil jacket has a radius that is at least approximately 5 millimeters less than the circumferential outer diameter of the body and the circumferential inner wall of the oil jacket has a radius that is at least approximately 5 millimeters greater than the inner diameter of the body.

According to another aspect, the oil jacket has an axial depth that is between approximately 0.1 times a thickness of the rotor end ring and approximately 0.8 times the thickness of the rotor end ring.

According to another aspect, the oil jacket has an axial depth that is between approximately 2 millimeters and approximately 4 millimeters.

According to another aspect, the at least one inlet extends radially between the inner diameter of the body and the inner wall of the oil jacket.

According to another aspect, the at least one inlet has an axial depth that is approximately equal to the axial depth of the oil jacket and a width that is between approximately 3 millimeters and 10 millimeters.

According to another aspect, the at least one inlet comprises two inlets positioned approximately 180 degrees apart.

According to another aspect, the plurality of outlets are circumferential slots equidistantly spaced around the face of the body in a circular pattern.

According to another aspect, the plurality of outlets are positioned adjacent the circumferential inner wall of the oil jacket.

According to another aspect, the outlets have a radial width that is between approximately 1 millimeter and 10 millimeters.

According to another aspect, the outlets have a circumferential length that is equal to (360 degrees/N)×0.95, wherein N is the number of outlets.

According to another aspect, the combined circumferential length of the plurality of outlets is less than or equal to approximately 342 degrees.

According to another aspect, the body is formed from a thermally conductive material.

According to several aspects of the present disclosure, a rotor end ring for an electric motor includes an annular disk shaped body having a circumferential outer diameter and a circumferential inner diameter and being formed from a thermally conductive material, a recess formed within a face of the body, an oil jacket formed within a back side of the body, the oil jacket comprising an annular channel having a circumferential outer wall and a circumferential inner wall, two inlets positioned approximately 180 degrees apart, each inlet extending radially between the inner diameter of the body and the inner wall of the oil jacket and adapted to allow coolant to enter the oil jacket, and a plurality of outlets, each outlet comprising a circumferential slot, the plurality of outlets equidistantly spaced around the face of the body in a circular pattern adjacent the circumferential inner wall of the oil jacket and adapted to allow coolant to flow from the oil jacket, through the rotor end ring to the recess formed within the face of the body.

According to another aspect, the circumferential outer wall of the oil jacket has a radius that is at least approximately 5 millimeters less than the circumferential outer diameter of the body, the circumferential inner wall of the oil jacket has a radius that is at least approximately 5 millimeters greater than the inner diameter of the body, and an axial depth of the oil jacket is between approximately 0.1 times a thickness of the rotor end ring and approximately 0.8 times the thickness of the rotor end ring.

According to another aspect, each inlet has an axial depth that is approximately equal to the axial depth of the oil jacket and a width that is between approximately 3 millimeters and 10 millimeters, and each of the outlets has a radial width that is between approximately 1 millimeter and 10 millimeters and a circumferential length that is equal to (360 degrees/N)×0.95, wherein N is the number of outlets.

According to several aspects of the present disclosure, an electric motor includes a housing, a stator mounted stationary within the housing and having end turn windings, a rotatable central shaft, a rotor mounted onto the central shaft for rotation within the stator, the stator, central shaft and rotor all positioned co-axially within the housing, and a rotor end ring mounted onto the central shaft adjacent an axial end of the rotor, the rotor end ring including an annular disk shaped body having a circumferential outer diameter and a circumferential inner diameter and being formed from a thermally conductive material, a recess formed within a face of the body, an oil jacket formed within a back side of the body, the oil jacket comprising an annular channel having a circumferential outer wall and a circumferential inner wall, two inlets positioned approximately 180 degrees apart, each inlet extending radially between the inner diameter of the body and the inner wall of the oil jacket and adapted to allow coolant to enter the oil jacket, and a plurality of outlets, each outlet comprising a circumferential slot, the plurality of outlets equidistantly spaced around the face of the body in a circular pattern adjacent the circumferential inner wall of the oil jacket and adapted to allow coolant to flow from the oil jacket, through the rotor end ring to the recess formed within the face of the body.

According to another aspect, the circumferential outer wall of the oil jacket has a radius that is at least approximately 5 millimeters less than the circumferential outer diameter of the body, the circumferential inner wall of the oil jacket has a radius that is at least approximately 5 millimeters greater than the inner diameter of the body, and an axial depth of the oil jacket is between approximately 0.1 times a thickness of the rotor end ring and approximately 0.8 times the thickness of the rotor end ring.

According to another aspect, each inlet has an axial depth that is approximately equal to the axial depth of the oil jacket and a width that is between approximately 3 millimeters and 10 millimeters, and each of the outlets has a radial width that is between approximately 1 millimeter and 10 millimeters and a circumferential length that is equal to (360 degrees/N)×0.95, wherein N is the number of outlets.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
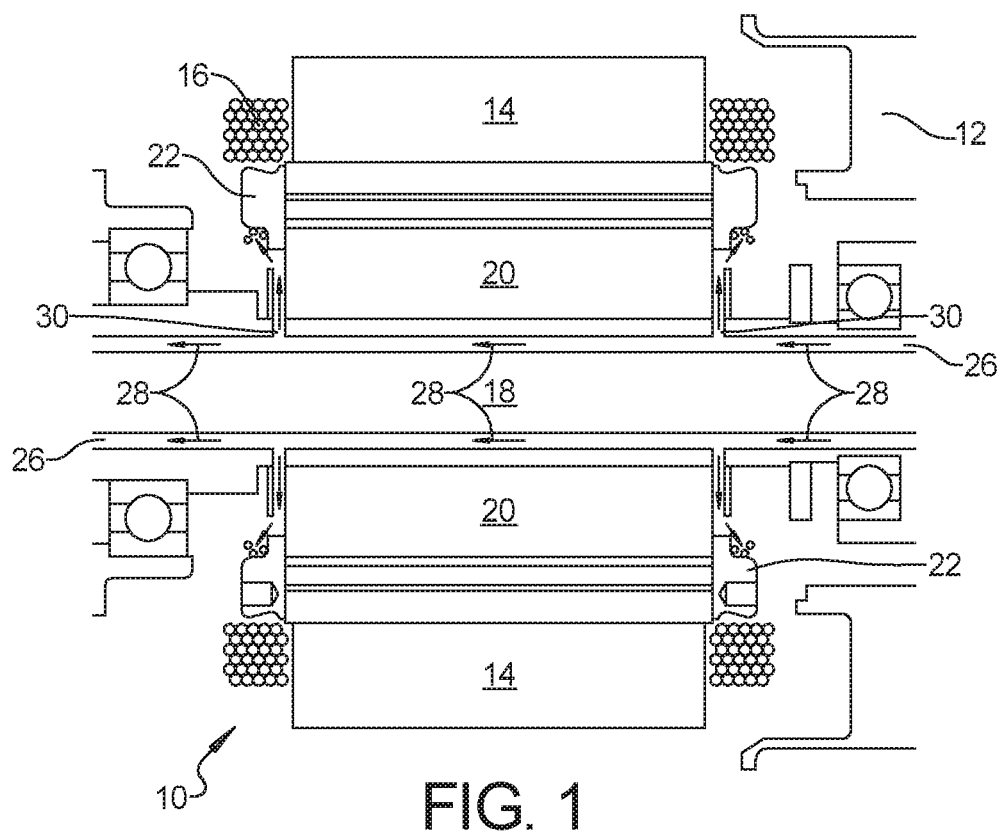
FIG. 1 is sectional view of an electric motor having a rotor end ring according to an exemplary embodiment of the present disclosure.

Referring to FIG. 1, an electric motor 10 according to an exemplary embodiment of the present invention includes a housing 12. A stator 14 is mounted stationary within the housing 12. The stator 14 is generally cylindrical in shape and includes end turn windings 16 on either axial end thereof. A rotatable central shaft 18 is supported by and extends longitudinally within the housing 12. A rotor 20 is mounted onto the central shaft 18 for rotation within the stator 14. The stator 14, central shaft 18 and rotor 20 are all positioned co-axially within the housing 12. A rotor end ring 22 is mounted onto the central shaft 18 adjacent each axial end of the rotor 20. The central shaft 18, the rotor 20 and the rotor end ring 22 rotate unitarily within the housing 12.

Heat is generated by electric current running through the electric motor 10. Coolant is circulated through the electric motor 10 to remove heat and prevent the electric motor 10 from overheating. Coolant is directed through passages 26 formed within the central shaft 18, as indicated by arrows 28. At least one orifice 30 is formed within the central shaft 18 and allows coolant to flow axially outward from the passages 26 to the rotor end ring 22.

Figure 2:
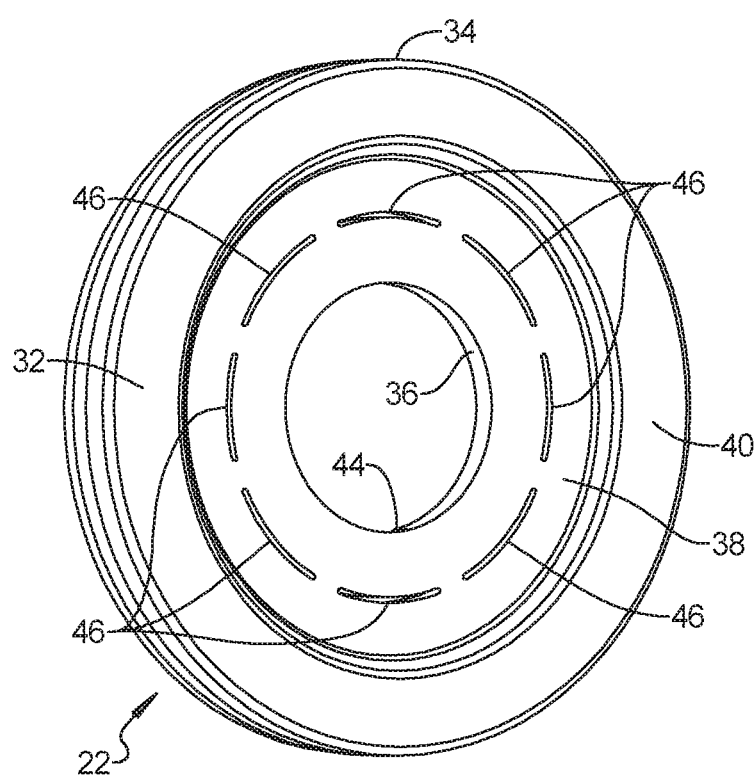
FIG. 2 is a perspective view of a rotor end ring according to an exemplary embodiment of the present disclosure.
Figure 3:
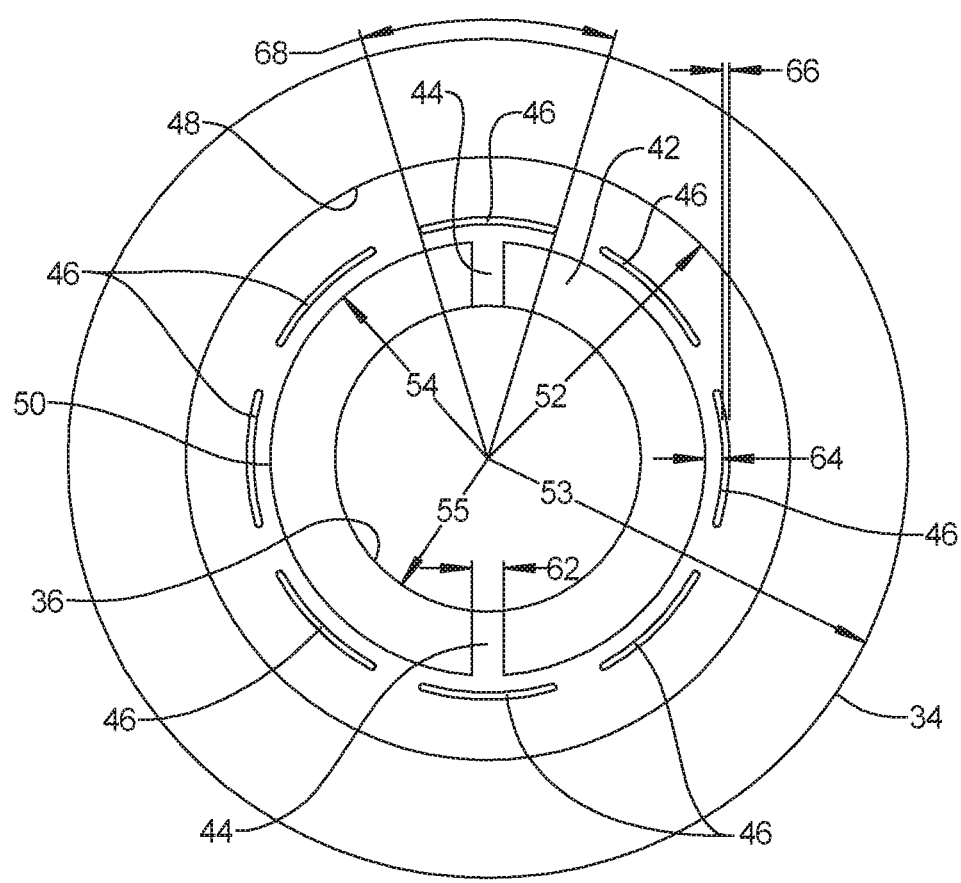
FIG. 3 is an end view of the rotor end ring shown in FIG. 1.

Referring to FIG. 2 and FIG. 3, the rotor end ring 22 includes an annular disk shaped body 32 having a circumferential outer diameter 34 and a circumferential inner diameter 36. The inner diameter 36 of the body 32 is adapted to engage the central shaft 18. The rotor end ring 22 may be attached to the central shaft 18 by any suitable means, such as, by way of non-limiting example, an interference press-fit.

The rotor end ring 22 includes a recess 38 formed within a face 40 of the body 32, and an oil jacket 42 formed within a back side 44 of the body 32. At least one inlet 44 is in fluid communication with the at least one orifice 30 and adapted to allow coolant to enter the oil jacket 42. A plurality of outlets 46 extend axially through the body 32 of the rotor end ring 22 and are adapted to allow coolant to flow from the oil jacket 42, through the rotor end ring 22 to the recess 38 formed within the face 40 of the body 32.

Figure 4:
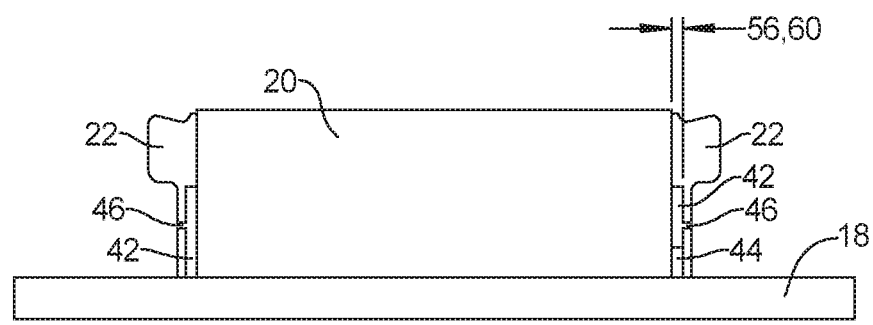
FIG. 4 is schematic sectional view of a rotor, rotor end ring and central shaft of the electric motor shown in FIG. 2.
Figure 4:

Referring to FIG. 3 and FIG. 4, the oil jacket 42 is an annular channel having a circumferential outer wall 48 and a circumferential inner wall 50. In an exemplary embodiment, the circumferential outer wall 48 of the oil jacket 42 has a radius 52 that is at least approximately 5 millimeters less than a radius 53 of the circumferential outer diameter 34 of the body 32 and the circumferential inner wall 50 of the oil jacket 42 has a radius 54 that is at least approximately 5 millimeters greater than a radius 55 of the inner diameter 36 of the body 32. The oil jacket 42 has an axial depth 56 that is between approximately 0.2 times an axial thickness 58 of the rotor end ring 22 and approximately 0.5 times the axial thickness 58 of the rotor end ring 22. In an exemplary embodiment, the axial thickness 58 of the rotor end ring 22 is approximately 6 millimeters and the axial depth 56 of the oil jacket 42 is between approximately 2 millimeters and approximately 4 millimeters.

The at least one inlet 44 extends radially between the inner diameter 36 of the body 32 and the inner wall 50 of the oil jacket 42 and has an axial depth 60 that is approximately equal to the axial depth 56 of the oil jacket 42 and a width 62 that is between approximately 3 millimeters and 10 millimeters. As shown, in an exemplary embodiment, the rotor end ring 22 includes two inlets 44 spaced radially 180 degrees apart from each other.

Each of the plurality of outlets 46 is a circumferential slot. The plurality of outlets 46 are spaced equidistantly around the face 40 of the body 32 in a circular pattern. The outlets 46 are positioned adjacent the circumferential inner wall 50 of the oil jacket 42. In an exemplary embodiment, the radial distance 64 between the outlets and the circumferential inner wall 50 of the oil jacket 42 is minimized, and may be zero millimeters. In an exemplary embodiment, the outlets 46 have a radial width 66 that is between approximately 1 millimeter and 10 millimeters, and a circumferential length 68 that is approximately equal to (360 degrees/N)×0.95, wherein N is the number of outlets 46. As shown, in an exemplary embodiment, the rotor end ring 22 includes eight outlets 46 and the combined circumferential lengths 68 of the eight outlets 46 is less than or equal to approximately 342 degrees.

The rotor end ring 22 may be made from any thermally conductive material suitable to conduct heat from the electric motor 10 to the coolant. In an exemplary embodiment, the rotor end ring 22 is formed from aluminum.

In operation, the central shaft 18, the rotor 20 and the rotor end ring 22 all rotate unitarily within the electric motor 10. As coolant flows into the oil jacket 46 from the central shaft 18, centrifugal forces push the coolant radially outward such that the coolant pools within the oil jacket 42 radially outward of the outlets 46. Once a sufficient amount of coolant has pooled within the oil jacket 42 the coolant begins to flow axially through the outlets 46.

The position of the outlets 46 adjacent the circumferential inner wall 50 of the oil jacket 42 allows the coolant to pool within the oil jacket 42, absorbing heat from the rotor end ring 22 and the rotor 20 itself. Because the coolant is pooled within the oil jacket 42, the coolant remains within the oil jacket 42 for a length of time and heat is more effectively absorbed by the coolant. In addition, the pooling of the coolant within the oil jacket 42 ensures that the coolant will flow evenly from all of the outlets 46. Rather than allowing the coolant to flow immediately from the inlets 44 to the nearest outlet 46, the coolant must first fill up the oil jacket 42 and disperse throughout the oil jacket 42. Once the coolant fills the oil jacket 42 to a point where the coolant will flow through the outlets 46, the coolant will flow evenly through all of the plurality of outlets 46.

Figure 5:
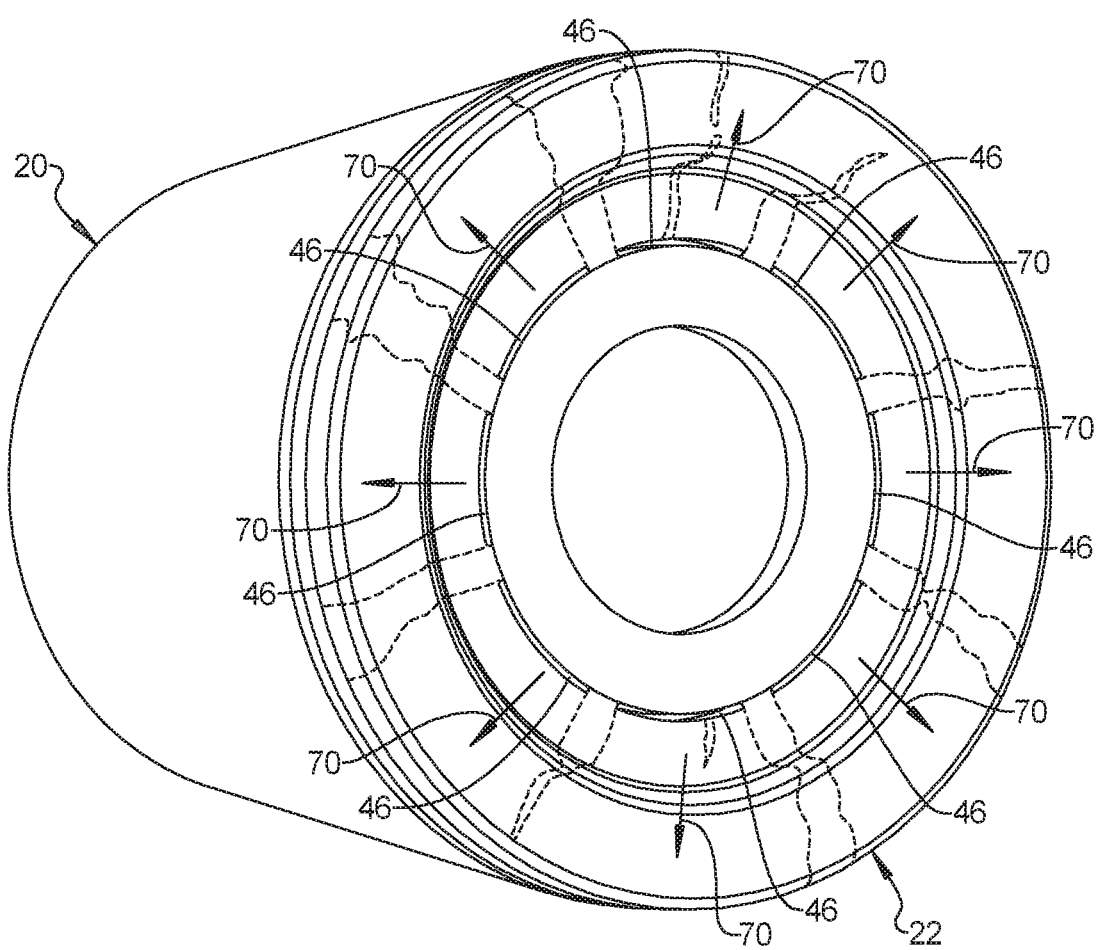
FIG. 5 is a schematic view of a rotor and rotor end ring illustrating coolant flow across a face of the rotor end ring.

Referring to FIG. 5, once the coolant flows axially through the outlets 46, the coolant is propelled across the face 40 of the rotor end ring 22, as indicated by arrows 70. The circumferential shape of the outlets 46 allows the coolant to more evenly spread across the face 40 of the rotor end ring 22, providing better cooling of the rotor end ring 22.

Ultimately, the coolant flows across the recess 38, radially outward toward the outer circumference 34 of the body 32, and radially outward onto the end turn windings 16 of the stator 14 to provide additional cooling of the end turn windings 16. Due to the spinning of the rotor end ring 22, the coolant is propelled by centrifugal forces across the face 40 of the rotor end ring 22 at relatively high velocity and provides cooling of the end turn windings 16.

An electric motor 10 and rotor end ring 22 of the present disclosure offers several advantages. These include two-stage cooling for the electric motor 10. First, the coolant pools within the oil jacket 42 and absorbs heat internally from the rotor end ring 22 and the rotor 20, and second, the coolant flows outward through the outlets 46 and radially across the face 40 of the rotor end ring 22 to provide additional cooling of the face 40 of the rotor end ring 22. More effective cooling of the rotor end ring 22 will reduce deformation of the rotor end ring 22 due to thermal expansion, and more even spreading of coolant across the face 40 of the rotor end ring 22 will provide better spray of the coolant onto end turn windings 16 of the stator 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rotor end ring for an electric motor comprising:
   an annular disk shaped body having a circumferential outer diameter and a circumferential inner diameter;
   a recess formed within a face of the body;
   an oil jacket formed within a back side of the body;
   at least one inlet adapted to allow coolant to enter the oil jacket; and
   a plurality of outlets adapted to allow coolant to flow from the oil jacket, through the rotor end ring to the recess formed within the face of the body, wherein the plurality of outlets includes circumferential slots equidistantly spaced around the face of the body in a circular pattern, and a combined circumferential length of the plurality of outlets is less than or equal to approximately 342 degrees.

2. The rotor end ring of claim 1, wherein the oil jacket is an annular channel having a circumferential outer wall and a circumferential inner wall.

3. The rotor end ring of claim 2, wherein the circumferential outer wall of the oil jacket has a radius that is at least approximately 5 millimeters less than the circumferential outer diameter of the body and the circumferential inner wall of the oil jacket has a radius that is at least approximately 5 millimeters greater than the inner diameter of the body.

4. The rotor end ring of claim 2, wherein the oil jacket has an axial depth that is between approximately 0.2 times a thickness of the rotor end ring and approximately 0.5 times the thickness of the rotor end ring.

5. The rotor end ring of claim 2, wherein the oil jacket has an axial depth that is between approximately 2 millimeters and approximately 4 millimeters.

6. The rotor end ring of claim 2, wherein the at least one inlet extends radially between the inner diameter of the body and the inner wall of the oil jacket.

7. The rotor end ring of claim 6, wherein the at least one inlet has an axial depth that is approximately equal to an axial depth of the oil jacket and a width that is between approximately 3 millimeters and 10 millimeters.

8. The rotor end ring of claim 6, wherein the at least one inlet comprises two inlets positioned approximately 180 degrees apart.

9. The rotor end ring of claim 2, wherein the plurality of outlets are positioned adjacent the circumferential inner wall of the oil jacket.

10. The rotor end ring of claim 2, wherein the outlets have a radial width that is between approximately 1 millimeter and 10 millimeters.

11. The rotor end ring of claim 2, wherein the outlets have a circumferential length that is equal to (360 degrees/N)× 0.95, wherein N is the number of outlets.

12. The rotor end ring of claim 2, wherein the body is formed from a thermally conductive material.

13. A rotor end ring for an electric motor comprising:
    an annular disk shaped body having a circumferential outer diameter and a circumferential inner diameter and being formed from a thermally conductive material;
    a recess formed within a face of the body;
    an oil jacket formed within a back side of the body, the oil jacket comprising an annular channel having a circumferential outer wall and a circumferential inner wall;
    two inlets positioned approximately 180 degrees apart, each inlet extending radially between the inner diameter of the body and the inner wall of the oil jacket and adapted to allow coolant to enter the oil jacket, each inlet having an axial depth that is approximately equal to an axial depth of the oil jacket and a width that is between approximately 3 millimeters and 10 millimeters; and
    a plurality of outlets, each outlet comprising a circumferential slot, the plurality of outlets equidistantly spaced around the face of the body in a circular pattern adjacent the circumferential inner wall of the oil jacket and adapted to allow coolant to flow from the oil jacket, through the rotor end ring to the recess formed within the face of the body.

14. The rotor end ring of claim 13, wherein the circumferential outer wall of the oil jacket has a radius that is at least approximately 5 millimeters less than the circumferential outer diameter of the body, the circumferential inner wall of the oil jacket has a radius that is at least approximately 5 millimeters greater than the inner diameter of the body, and an axial depth of the oil jacket is between approximately 0.2 times a thickness of the rotor end ring and approximately 0.5 times the thickness of the rotor end ring.

15. The rotor end ring of claim 14, wherein each of the outlets has a radial width that is between approximately 1 millimeter and 10 millimeters and a circumferential length that is less than or equal to (360 degrees/N)×0.95, wherein N is the number of outlets.

16. An electric motor comprising:
a housing;
a stator mounted stationary within the housing and having end turn windings;
a rotatable central shaft;
a rotor mounted onto the central shaft for rotation within the stator, the stator, central shaft and rotor all positioned co-axially within the housing; and
a rotor end ring mounted onto the central shaft adjacent an axial end of the rotor, the rotor end ring including:
an annular disk shaped body having a circumferential outer diameter and a circumferential inner diameter and being formed from a thermally conductive material;
a recess formed within a face of the body;
an oil jacket formed within a back side of the body, the oil jacket comprising an annular channel having a circumferential outer wall and a circumferential inner wall, wherein the circumferential outer wall of the oil jacket has a radius that is at least approximately 5 millimeters less than the circumferential outer diameter of the body, the circumferential inner wall of the oil jacket has a radius that is at least approximately 5 millimeters greater than the inner diameter of the body, and an axial depth of the oil jacket is between approximately 0.1 times a thickness of the rotor end ring and approximately 0.8 times the thickness of the rotor end ring;
two inlets positioned approximately 180 degrees apart, each inlet extending radially between the inner diameter of the body and the inner wall of the oil jacket and adapted to allow coolant to enter the oil jacket; and
a plurality of outlets, each outlet comprising a circumferential slot, the plurality of outlets equidistantly spaced around the face of the body in a circular pattern adjacent the circumferential inner wall of the oil jacket and adapted to allow coolant to flow from the oil jacket, through the rotor end ring to the recess formed within the face of the body.

17. The electric motor of claim 16, wherein each inlet has an axial depth that is approximately equal to the axial depth of the oil jacket and a width that is between approximately 3 millimeters and 10 millimeters, and each of the outlets has a radial width that is between approximately 1 millimeter and 10 millimeters and a circumferential length that is less than or equal to (360 degrees/N)×0.95, wherein N is the number of outlets.

* * * * *